United States Patent
Fischer

[15] 3,663,143
[45] May 16, 1972

[54] APPARATUS FOR MAKING HOLLOW ARTICLES

[72] Inventor: Stefan Fischer, Lohmar, Bezirk, Cologne, Germany

[22] Filed: Jan. 28, 1970

[21] Appl. No.: 6,520

[30] Foreign Application Priority Data

Jan. 28, 1969 Germany..................P 19 04 034.7

[52] U.S. Cl..............................................425/244, 425/326
[51] Int. Cl............................................................B29c 5/06
[58] Field of Search..........................18/5 BJ, 5 BK, 5 BE, 5 B

[56] References Cited

UNITED STATES PATENTS

| 3,480,993 | 12/1969 | Schjeldahl et al.........................18/5 BJ |
| 3,305,890 | 2/1967 | Senior et al..............................18/5 BJ |

FOREIGN PATENTS OR APPLICATIONS

| 1,023,888 | 3/1966 | Great Britain.......................18/30 JM |

Primary Examiner—J. Spencer Overholser
Assistant Examiner—Norman E. Lehrer
Attorney—Lilling & Siegel

[57] ABSTRACT

This invention relates to a method and an apparatus for the production of hollow articles from thermoplastic synthetic plastic material.

10 Claims, 1 Drawing Figure

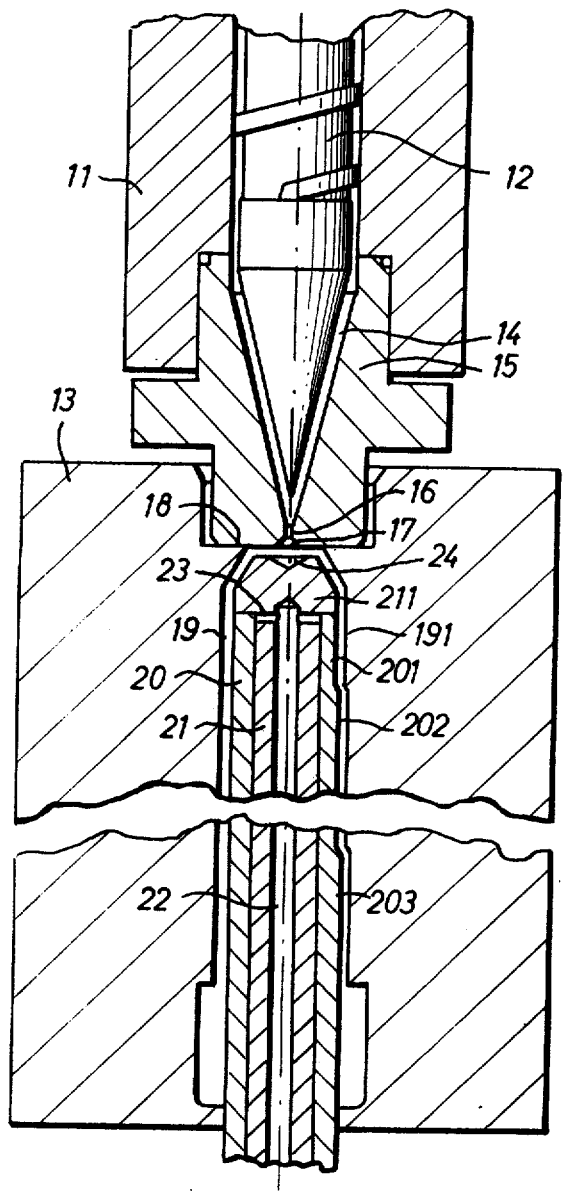

APPARATUS FOR MAKING HOLLOW ARTICLES

BACKGROUND OF THE INVENTION

The invention is concerned primarily with the production of hollow articles from thermoplastic synthetic plastic material using a pre-moulding formed by the injection-moulding method, which is then inflated in a blow mould into the finished article. However, the invention is usable not only in these cases but especially everywhere where the object is to process delicate materials, which incline to burn for example on heating to the processing temperature, without the occurrence of deterioration of the material and defective products.

It is known to produce the infection-moulded premouldings for example for synthetic plastic bottles in a manner in which the synthetic plastic composition is injected from an injection opening of the extruder, for example starting with the subsequent bottom of the article, into the mould. In this case the liquification temperature of the synthetic plastic composition can be taken only as far as what is called a critical temperature, that is to say to a temperature at which burning or decomposition is reliably avoided even in the case of composition standing for a certain time, as for example in work with ram heads or feed worms. However, in all appearance such a temperature is not sufficient for good liquification or preparation for the achievement of high grade products, especially in the case of delicate synthetic plastic compositions.

These defects and difficulties are to be eliminated by the invention. For this purpose, in a method of the initially mentioned kind, the invention provides that the synthetic plastic composition serving for the formation of the pre-moulding, which is warmed to a temperature which is critical in the case of a standing composition, is conducted during the injection into the mould through a narrow passage instigating a brief rise of temperature. The composition flowing out of the heating passage can then be conducted further into an expansion chamber and from this expansion chamber the composition can be forced through a further constricted cross section, possibly with renewed brief rise of temperature. Finally the forcing of the composition through a constricted cross section can be repeated a number of times over the injection length of the pre-moulding.

The invention further provides, especially for carrying out the method as described above, an apparatus for the production of hollow articles from thermoplastic synthetic plastic material which comprises an extruder for the injection of the composition into a pre-mould for the pre-moulding and a blow mould with devices for inflating the pre-moulding into the final form, and in which according to the invention a constricted passage cross section effecting a temperature rise of the composition is inserted into the conveying conduit for the synthetic plastic composition warmed up to the so-called critical processing temperature. This constriction of the passage cross section can be followed by an expansion and distribution chamber, which can again be followed by a constriction for the throughflow of composition. These constrictions finally can be arranged at intervals over the length of the pre-mould, regarded in the direction of flow of the composition.

In a form of embodiment of the apparatus which has proved expedient, the first heating constriction is arranged in the outlet conduit of the extruder shortly before the outlet opening for the composition. In this case for reasons of heat engineering it has proved expedient to use a part of the end wall of the mouthpiece of the extruder surrounding the outlet opening directly as part of the injection mould for the pre-moulding. The expansion chamber is then expediently formed by a recess in the mould wall of the injection mould lying opposite to the injection opening.

The invention permits many various possible embodiments. The invention will be explained in greater detail hereinafter by reference to two possible forms of embodiment indicated with the parts essential to the understanding of the invention diagrammatically in the accompanying drawing.

DESCRIPTION OF DRAWING AND PREFERRED EMBODIMENTS:

In the drawing, in both possible embodiments the synthetic plastic composition is injected from a worm press 11, serving as extruder, with the feed worm 12 into the bottom of a two-part pre-mould 13 for the pre-moulding. In this case the injectable composition is first gathered in a funnel-shaped part 14 of the mouthpiece 15 of the worm press 11, 12, before it is injected by the feed worm 12 into the injection mould 13. In this injection it is forced through a narrow passage 16 arranged in the mouthpiece 15, which passage is so dimensioned that the composition forced through it is briefly heated by an amount controlled by the walls adjoining the constriction, before it departs from the mouthpiece through the outlet opening 17.

The mouthpiece 15 abuts with its end face 18 against the mould 13 and forms a part of the outer wall of the mould cavity 19. From the end opposite to the outlet opening 17 of the extruder 11 a mould core extends into the mould cavity 19, which core is formed from the parts 20 and 21 which are displaceable in relation to one another. The part 21 is provided with air passages 22, 23, the outlet openings of which are formed by the part 20 of sleeve form during the injection of the synthetic plastic composition. Only for the inflation of the pre-moulding sealed on the core 20, 21 in the blow mould (not shown) are the air outlet openings opened by axial displacement of the part 20 of sleeve form to form an annular gap. In the head piece 211 of part 21 of the mould core a recess 24 is arranged which serves as expansion and distribution chamber for the synthetic plastic composition issuing from the outlet opening 17.

The mould cavity 19 in the mould 13 can be formed in numerous ways. Thus, in the left half of the drawing a mould cavity is illustrated which forms a pre-moulding having a constant annular cross section approximately from the bottom to the neck. Naturally the annular gap between mould cavity and mould core can also widen conically in one or the other direction. In the right half of the drawing the wall of the mould cavity 191 is shouldered in stepped form and the part 201 of sleeve form of the mould core is provided with corresponding step-shaped wall portions 202, 203. The dimensions are so selected here that the wall thickness of the pre-moulding to be formed is the same over its entire length or increases or decreases to a desired extent. The part 201 of sleeve form is displaceable together with the part 21 and the head piece 211 in the axial direction in relation to the mould cavity 191 by a specific, possibly variable amount. By reason of this displacement, constricted passage cross sections are formed between the mould core and the wall of the mould cavity 191 for the synthetic plastic composition, namely on each step-shaped thickening of the mould core and at the point of issue of the composition from the distribution chamber 24. With the aid of these constrictions a certain temperature rise of the composition is achievable which opposes excessive cooling off during the spray. The desired wall strength of the pre-moulding is achieved shortly before the injection procedure is finished. The pre-moulding which sits on the mould-core can then be inflated in the blow-mould. A cooling off can be achieved or an excessive temperature fall can be prevented if the mould-core is provided with corresponding cooling or heating channels (passages).

I claim:

1. An improved mould apparatus having a mould cavity for the production of hollow articles from thermoplastic synthetic plastic material, comprising, in combination, an extruder having a tapering cavity at the end of a feeding device, outlet conduit means and an outlet opening for the injection of said plastic material into a mould so as to form a pre-mould, and a blow mould core having passage means for the conveyance of a fluid adapted to inflate said pre-mould; the improvement which comprises first and second constricting passageways effecting a temperature rise of said plastic material, said first constricting passageway being disposed in said outlet conduit means of said extruder, for heating said plastic material to a pre-determined processing temperature; said second constructing passageway being disposed in said mold cavity; and an expansion and distribution chamber following said first constricting passageway.

2. The improved mould apparatus according to claim 1, wherein said second constricting passageway for the throughflow of said plastic material follows said expansion chamber.

3. The improved mould apparatus according to claim 2, wherein a plurality of further constricting passageways are provided along the length of said pre-mould in said mould cavity and in an axial direction following the path of said plastic material.

4. The improved mould apparatus according to claim 1, wherein said first constricting passageway resides between said tapering cavity and said outlet opening 5. The improved mould apparatus according to claim 1, wherein a portion of the outer end face wall of said extruder surrounding said outlet opening forms part of said mould for said pre-mould.

6. The improved mould apparatus according to claim 3, wherein said expansion chamber is formed by a recess in the mould wall of the mould facing directly opposite to said outer end face wall surrounding said outlet opening.

7. The improved mould apparatus according to claim 6, wherein said blow mould core is provided with a head element including said mould wall provided with said recess and is disposed within said mould cavity; said blow mould core comprising an outer sleeve element and an inner sleeve element having said passage means and said head element, said outer sleeve element being axially displacable with respect to said inner element, and said outer sleeve element having a plurality of wall portions which cooperate with the walls of said mould cavity to form said second and further constricting passageways in said mould.

8. The improved mould apparatus according to claim 2, wherein said second constricting passageway forms a constant annulus.

9. The improved mould apparatus according to claim 2, wherein said second constricting passageway is conically shaped.

10. The improved mould apparatus according to claim 7, wherein said second and further constricting passageways are formed by said wall portions of said outer sleeve which are step-shaped shoulders cooperating with corresponding step-shaped shoulders formed in said walls of said mould cavity.

* * * * *